Aug. 30, 1966  D. B. CAHOON ETAL  3,269,195
ACCELERATION AND RATE CONTROL FOR GYRO CASE ROTATION
Filed April 3, 1964  4 Sheets-Sheet 1

CARDINAL HEADING PHASING

| CARDINAL HEADING | HOME | +X | +Y | −X | −Y |
|---|---|---|---|---|---|
| RELAY ENERGIZED | | 80, 84 | 81, 83, 84 | 80, 82, 84 | 81, 82, 83, 84, |
| $S_1$ | $+\phi$ | | $\int$ | $+\phi$ | $\int$ |
| $S_3$ | | $+\phi$ | $\int$ | | $\int$ |
| $S_2$ | $+\phi$ | $\int$ | $+\phi$ | $\int$ | |
| $S_4$ | | $\int$ | | $\int$ | $+\phi$ |

FIG. 6  $\int$ INDICATES SHORT

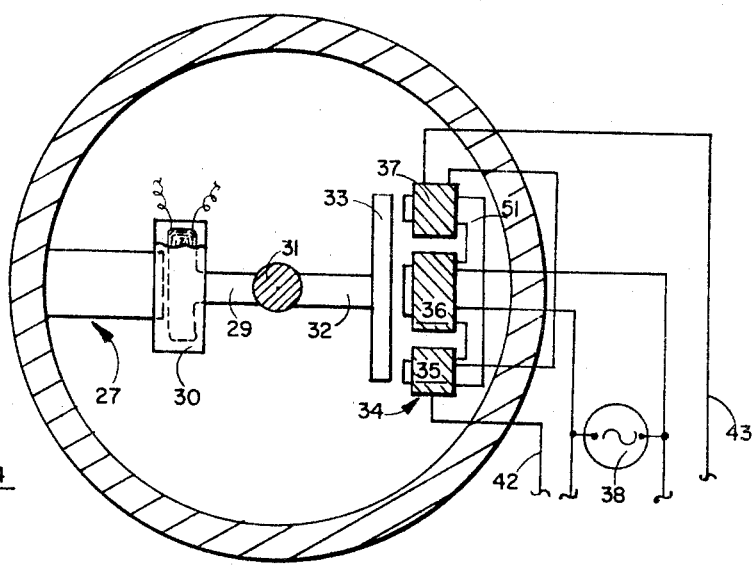

FIG. 4

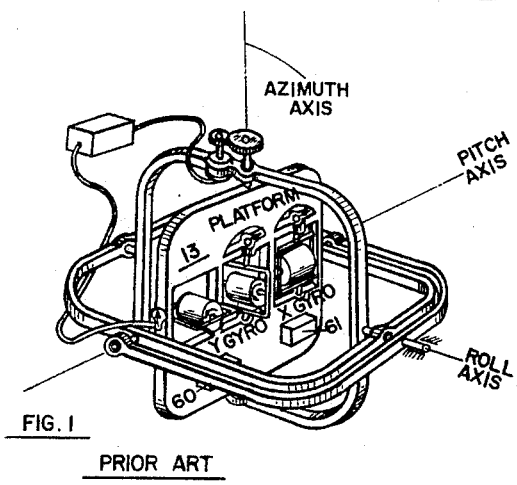

FIG. 1
PRIOR ART

INVENTORS
DICK B. CAHOON
LARRY B. ROMINE
BY
L. Lee Humphries
ATTORNEY

INVENTORS
DICK B. CAHOON
LARRY B. ROMINE
BY
L. Lee Humphries

ATTORNEY

INVENTORS
DICK B. CAHOON
LARRY B. ROMINE
BY L. Lee Humphries
ATTORNEY

United States Patent Office 3,269,195
Patented August 30, 1966

3,269,195
ACCELERATION AND RATE CONTROL FOR
GYRO CASE ROTATION
Dick B. Cahoon, La Mirada, and Larry B. Romine, Anaheim, Calif., assignors to North American Aviation, Inc.
Filed Apr. 3, 1964, Ser. No. 357,167
8 Claims. (Cl. 74—5.4)

This invention pertains to an improved gyroscopically stabilized platform and more particularly to such a device which uses an additional gyroscope, having a novel orientation, for correcting errors in the stabilizing gyroscopes of the platform.

It is known that platforms or angular reference systems for navigational purposes may be stabilized by three single-degree-of-freedom gyroscopes.

For example, see United States Patent No. 2,993,267, entitled, "Gyroscopically Stabilized Navigational Reference Device," by J. M. Slater et al., and assigned to North American Aviation, Inc.

Navigation platforms which are stabilized by three single-degree-of-freedom gyroscopes are adapted to remain fixed in an inertial space, i.e., caused to remain angularly fixed, relative to a predetermined coordinate system such as, for example, the fixed stars, a Cartesian coordinate system on the earth, and the like.

It is customary to carry acceleration or velocity sensitive devices on the platform to detect the motion of the platform, and through computer means to apply corrective torques to the respective gyroscopes to cause the gyroscopes to precess in a predetermined manner and conform to the desired coordinate system.

Unfortunately, gyroscopes have inherent errors due to mass unbalance, distortion of the rotor shaft, bearing imperfections, and the like. It is desirable that the effects of imperfections in the gyroscope be minimized. To that end, various schemes have been devised. One such scheme is described in United States Patent No. 2,999,391 entitled, "Self-Compensating Gyro Apparatus," by D. L. Freebairn et al., and assigned to North American Aviation, Inc. In the device of that patent, two gyroscopes are positioned on each of the axes about which the platform is to be stabilized. The direction of rotation of the rotor, or the angular momentum, is periodically reversed. By reversing the direction of rotation of the rotor, errors associated with rotor rotation are averaged or cancelled out.

Another scheme shown by the prior art is the mounting of an additional, single-degree-of-freedom, gyroscope to the platform by means of a gimbal. The gimbal mount allows the gyroscope to be rotated (precessed) about its axis such that its input (sensing) axis may be aligned parallel to the plus and minus input axis of at least one of the platform's stabilizing gyroscopes.

The drift error present in a stabilizing gyroscope will cause the platform to drift about the input axis of that gyroscope. By aligning the input axis of the additional gyroscope parallel to the input axis of one of the stabilizing gyroscopes, the drift about that axis will appear as a torque on the output axis of the additional gyroscope. The additional gyroscope also has its own drift errors and therefore the total torque present on its output axis will be proportional to the algebraic sum of the stabilizing gyroscope's drift and the additional gyroscope's drift.

The algebraic sign of the stabilizing gyroscope's drift error will be reversed, by rotating the additional gyroscope's input axis 180° such that its input axis is again parallel, but in the reversed sense, to the stabilizing gyroscope's input axis. A simultaneous solution of the two output torque signals will thereby yield a solution which is equal to the stabilizing gyroscope's drift error. Once, the error is determined, it may be corrected by applying a correction torque counter to the drift (error) torque.

On the three-gyroscope stabilized platform, two of the gyroscopes have their input axis in planes parallel to each other. It is, therefore, possible to align the input axis of the additional gyroscope to both of these gyroscopes, and determine their drift errors.

The third gyroscope has its input axis perpendicular to the other two gyroscopes, and as a result, alignment of the additional gyroscope to the third gyroscope is not attempted due to the complexity of the gimbaling arrangement necessary to supply the extra degree-of-freedom.

As previously mentioned, the additional gyroscope is of the single-degree-of-freedom type. Gyroscopes of this type have a high degree of accuracy but are subject to damage if excessive accelerations and angular velocities are applied about either their input or output axis. The additional gyroscope is subjected to these excessive rates and accelerations about its output axis when it is rotated for drift error determinations.

The device contemplated by this invention allows the additional gyroscope to sense and amplify a component of the torque (rate and acceleration) applied about the axis of rotation of the gimbal mount on its input axis. This is accomplished by slightly misaligning the additional gyroscope's output axis with respect to the axis of rotation of the gimbal mount. A component of the torque applied about the gimbal axis of rotation is thereby sensed on the input axis, amplified by the angular momentum H of the gyroscope rotor, and felt as a proportional torque on the output axis.

It is, therefore, an object of this invention to utilize an additional gyroscope to determine the errors inherent in the stabilizing gyroscopes of a gyroscopically stabilized platform.

It is a further object of this invention to use an additional gyroscope having a unique gimbaled mounting orientation, relative to a stabilized platform, to calibrate the errors inherent in the gyroscopes which stabilize the platform.

It is another object of this invention to limit the rate of rotation and acceleration of the additional gyroscope's input axis and case.

These and other objects of the invention will become apparent from the following description taken in connection with the accompanying drawings, in which:

FIG. 1 is a perspective view of a stabilized platform and gimbaling configuration which is commonly used in navigation systems.

FIG. 4 is a cut-away sectional view of the additional gyroscope, illustrating the gyroscope's pickoff and torquing means.

FIG. 6 is a chart, illustrating the correct relay energizing sequence used in obtaining the different cardinal headings of the additional gyroscope.

Figure 2:
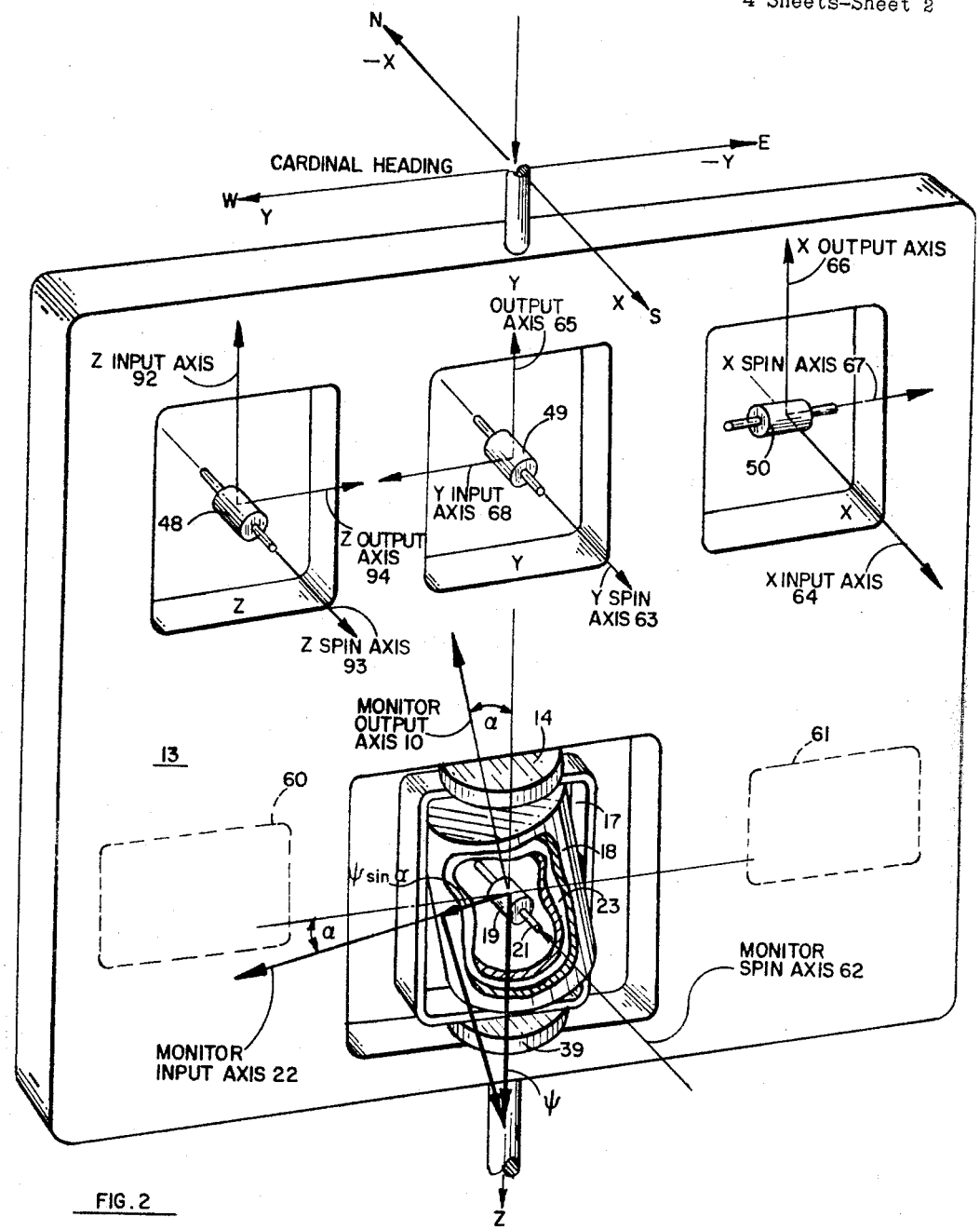
FIG. 2 is a cut-away perspective view, illustrating the mounting of an additional gyroscope to the stabilized platform.

Referring to FIGS. 1 and 2, three single-degree-of-freedom gyroscopes 48, 49, and 50 are mounted to the stabilized platform 13 with their input axes 92, 68 and 64 mutually orthogonal. Gyroscopes 48, 49, and 50, stabilize platform 13 about a coordinate system defined by the input axes of the stabilizing gyroscopes.

Input axis 92 defines the coordinate axis Z, input axis 68 defines the Y axis, and input axis 64 defines the X axis. When the Navigation System is to be used in a surface vessel, the cardinal headings N, S, E, and W, are generally used to designate the coordinates; they are shown superimposed on the −X, X, −Y, and +Y coordinate vectors.

The gyroscope spin axes 93, 63 and 67 and output axes 94, 65 and 66, along with input axes 92, 68, and 64 form a set of mutually orthogonal vectors for gyroscopes 48, 49, and 50 respectively.

Gyroscopes suitable for use on the platform 13 are described in United States Patent No. 2,995,937 entitled, "Flotation Gyroscope," by J. M. Slater et al., and assigned to North American Aviation, Inc. Stabilized platform 13 also carries a pair of velocity meters 60 and 61. A typical velocity meter which may be positioned upon the stabilized platform to measure velocity is described in United States Patent No. 2,964,949, entitled, "Induction Velocity Meter" by D. E. Wilcox and assigned to North American Aviation, Inc.

Platform 13 is maintained in the vertical position and in some predetermined azimuth orientation, for example NSEW, by velocity meters 60 and 61, gyroscopes 48, 49 and 50, and other controls not in themselves a part of this invention.

Figure 3:
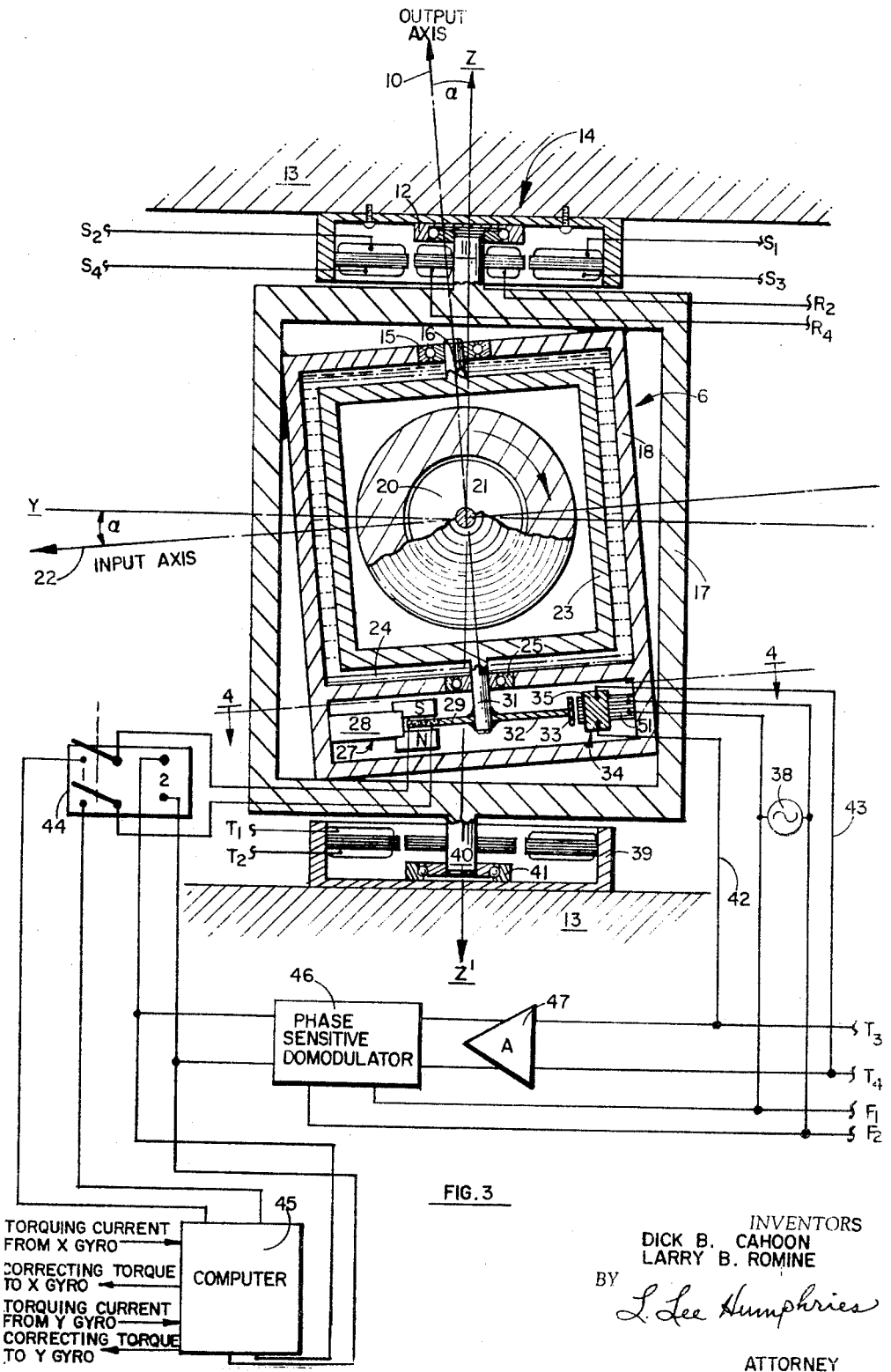
FIG. 3 is a sectional view, illustrating the additional gyroscope, its physical placement, and a portion of the electronics required to control the additional gyroscope.

Gimbal member 17 is rotatably mounted to platform 13 by shafts 11 and 40, and bearings 12 and 41 which are shown in FIG. 3. Shafts 11 and 40 are aligned with the Z-axis, and define the rotational axis of gimbal 17. Torquer 39 applies the driving torque to rotate gimbal 17. Angle resolver 14 determines the angular displacement of gimbal 17 about the Z-axis.

The additional single-degree-of-freedom gyroscope 6 is fixedly mounted by its case 18 to gimbal member 17, such that the output axis 10 is inclined at a predetermined angle α with respect to the Z-axis.

Gyroscope 6 is of the single-degree-of-freedom type having an input (sensing) 22, output 10, and spin 62, axis fixed mutually orthogonal to each other. FIG. 3 shows a typical single-degree-of-freedom gyroscope suitable for use in connection with this invention.

The rotor 19, of a substantial moment of inertia H, is supported on ball bearings (not shown) for spinning at high rates of speed. Electric motor 20 supplies the torque for spinning rotor 19. The bearing shaft 21 is fixed to an internal, fluid tight, gimbal float member 23 which is immersed in a fluid 24, and pivoted to a gyroscope case 18 by shafts 16 and 31, and bearings 15 and 25. Bearings 15 and 25 are of the minimum friction type. In standard nomenclature for gyroscopes of the type shown, the normal undeflected direction of the rotor spin axis is termed the spin reference axis and is shown as axis 62 in FIG. 2.

An angle pickoff 34 is provided to give a signal indication of any rotation (precession) of inner gimbal 23 relative to the gyroscope case 18. The pickoff signal is transmitted to amplifier 47 and then to phase sensitive demodulator 46, which provides a D.C. signal; the amplitude of which indicates the amount of angular rotation of inner gimbal 23 and the polarity of which indicates the direction of rotation. When switch 44 is in position 2, the signal is sent from demodulator 46 to gyro torquer 27. When switch 44 is in position 1, computer 45 is connected to sense the torquing current applied to torquer 27. The computer, also senses the torquing currents from the platform stabilizing gyroscopes and computes the drift errors associated with each of the stabilizing gyroscopes. Torquer 27 has a coil 29 extending into the gap of permanent magnet 30. On energization of coil 29 with direct current, a proportional moment is applied about the gyroscope output axis 10. Torquer 27 acts in response to pickoff 34 to remove rotations of inner gimbal 23 with respect to outer case 18. Referring to FIG. 4, the angle pickoff 34 is illustrated as having a soft iron member 33 connected by arm 32 to shaft 31 to be rotated by inner gimbal 23. Laminated core 51 is of an E-type configuration having coils on its outer limbs connected in series opposition to each other and connected to provide an output to amplifier 47. Frequency source 38 is connected to coil 36 on the center limb of core 51 and acts to provide excitation. As soft iron member 33 moves relative to the laminated core 51, flux is unevenly coupled from the center core 36 to outer cores 35 and 37 providing a signal the phase of which indicates the direction of rotation of shaft 31. Frequency source 38 also provides a reference frequency to phase sensitive demodulators 46 and 70 to demodulate the output signals from amplifier 47 and 69 respectively.

Figure 5:
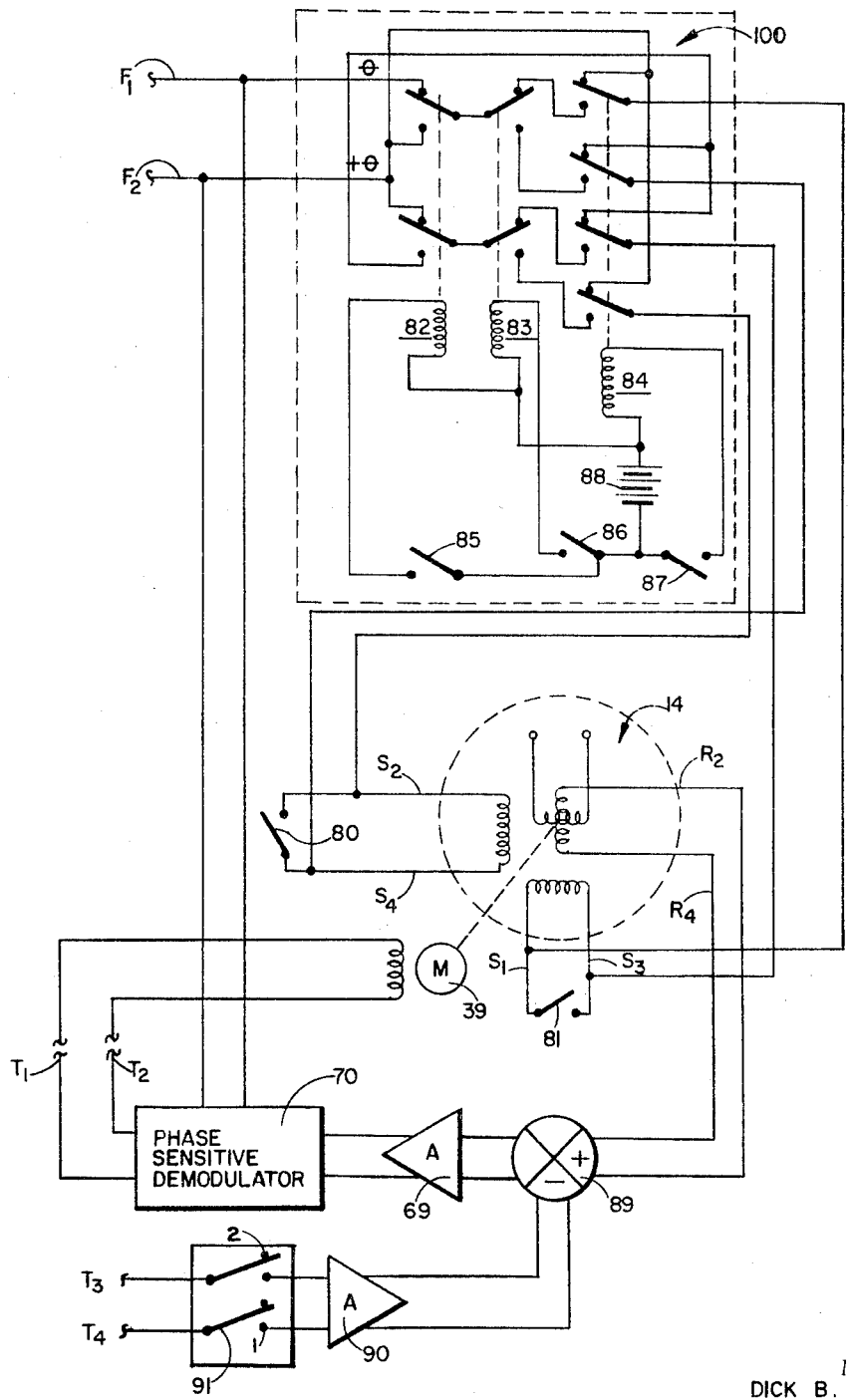
FIG. 5 is a schematic drawing illustrating the remainder of the control electronics required for operation of the additional gyroscope.

In order to determine a gyroscope's drift errors accurately, it is necessary to have the input axis 22 accurately aligned to the input axis of the gyroscope under check. Mechanical alignment of the gyroscope case 18 and input axis 22 to tolerances of this magnitude is very difficult, hence a correct null position is obtained electrically. This is accomplished, referring to FIGS. 3 and 5, by introducing a signal from signal generator 38, in various phase relationships, to resolver 14. The appropriate selection of resolver winding excitation for the different cardinal headings is given by the chart in FIG. 6. For each of the four cardinal headings N, S, E, W, one winding of the resolver 14 is excited by relay bank 100 while a short is made across one of the unexcited windings by switch 80 or switch 81; FIG. 6 shows the correct sequencing of these switches.

The input axis 22, alignment servo, which consists of resolver 14 servo-amplifier 69, demodulator 70, and gimbal torquer motor 39, operates at five different states, home, +X, −X, +Y, −Y. These five states are achieved by energizing relays 82, 83 and 84 from potential source 88 by means of switches 85, 86, and 87, according to the sequence shown in FIG. 6. A computer (not shown) may be connected to relay bank 100 to automatically advance the input axis alignment servo through the five states.

With both stator windings (S2–S4 and S1–S3) excited, the system is in the "home" position. This mode is necessary to initiate drift-error detection, so that gimbal 17 and gyroscope 6 are not driven to their physical limits. A physical limitation is present on the gimbal's motion because of the electrical wire connections that are necessary for operation of gyroscope 6.

Upon selection of a cardinal heading, an appropriate relay combination excites the desired cardinal heading resolver winding. The azimuth position servo would respond to this large angular difference input with full torquer capacity, even though the gyroscope's angular pickoff 34 is servoed or as is commonly called "caged" by servo-amplifier 47 and torquer 27. The mismatch in pickoff caging and alignment torque capacities would force the pickoff 34 to an extreme physical position which would damage it.

However, by tilting the gyroscope's case 18, an angle α about the Z axis of rotation, the gyro-pickoff voltage present on terminals 42 and 43 will contain information which is proportional to the torque (angular velocities and accelerations) applied about the Z axis. This voltage is fed to amplifier 90 by switch 91 when the case 18 is ready to be rotated. The voltage is amplified by servo amplifier 90 and summed into the input axis alignment servo loop at summing point 89 as a feedback voltage which limits the angular activity of gyroscope case 18 according to a predetermined maximum allowable pickoff angle.

If the input axis 22 and output axis 10 were not rotated, an angle α about the spin axis 62, there would be no gyroscopic action for torques applied about the output axis 10. With the input axis 22 inclined at an angle α, a torque (rate $\dot{\psi}$) about the Z-axis will result in a $\dot{\psi} \sin \alpha$ component of torque about the input axis 22. The equation for gyroscopic torque T developed about the output axis 10 will therefore be:

(1) $$T = H\dot{\psi} \sin \alpha$$

For small angles of $\alpha$;

$$T = H\dot{\psi}\alpha$$

from Equation 1, it is shown that a rate applied about gimbal 17's rotational axis will generate a torque T on the output axis 10 that is proportional to the gyroscope rotor angular momentum H. The output torque T will cause gimbal float member 23 to precess about the output axis 10 which in turn will cause a pickoff voltage to appear at terminals 42 and 43.

In contrast, the angular acceleration of the gimbal 17 and the case 18 will be coupled to the inner gimbal 23 through the viscous fluid 24, by the viscosity coefficient $\beta$: Angular accelerations about the Z axis will therefore not be amplified by a factor H, but by some smaller factor which is dependent upon the viscous coefficient $\beta$. In order to adjust external servo-amplifier gains to satisfy the needs of both rate $\dot{\psi}$ and acceleration, the fluid viscosity $\beta$ should be about the same magnitude as the rotor momentum $\alpha$ product. Hence, $\alpha$ should be chosen by the following formula:

(2) $$\alpha = \beta/H$$

where:

$\alpha$ = angle of misalignment
$\beta$ = fluid viscosity
$H$ = rotor angular momentum In operation, gimbal 17 is initially aligned in the "home" position. Switch 91 is closed connecting terminals 42 and 43 to amplifier 90. Switch 44 is placed in position 2, disconnecting computer 45 from gyroscope 6's "caging" servo loop. Switches 80 and 87 are closed to supply the correct voltage phase to resolver 14 as per the chart of FIG. 6, for aligning the input axis 22, of the additional gyroscope to the input axis 64 of gyroscope 50. The angular difference, detected by resolver 14, between the position of gimbal 17 and the required heading of input axis 22 produces an output voltage on the resolver's rotor terminals $R_2$ and $R_4$. This voltage is fed to summing point 89 and then to amplifier 69, and phase sensitive demodulator 70. The output of demodulator 70 is a D.C. voltage whose amplitude is proportional to the angular difference between the actual and required heading of input axis 22. The D.C. voltage is then fed to torquer motor 39 which is connected to apply a torque about gimbal 17's rotational axis to null the angular difference to zero. As the rate and acceleration of gimbal 17 increases, the voltage from amplifier 90 is summed into summing point 89 to limit the torque applied to gimbal torquer motor 39.

Although in actual practice, a computer is used to sense the additional gyroscope's "caging" torque and to calculate the correcting bias for the stabilizing gyroscopes, it is obvious that other torque sensing and correcting means other than a computer may be used satisfactorily.

When gimbal 17 reaches the selected resolver null, the rate feedback is switched out by switch 91. This brings the input axis alignment servo into a high gain gimbal "cage." Following this switching sequence, switch 44 is energized to transfer the additional gyroscope's pickoff "caging" operation to computer 45. Computer 45 controls and stores the information pertaining to the additional gyroscope's "caging" torque which is a function of both platform and the additional gyroscope's drift. Switch 44 is then de-energized and the input axis 22 is rotated 180° following the previously described procedure. When gimbal 17 has been rotated the required 180°, rate feedback is again switched out by switch 91. Switch 44 is energized and information pertaining to the additional gyroscope "caging" torque is again fed to computer 45. Computer 45 calculates the algebraic difference between the stored and lastly received information, and applies the calculated result as drift correction to the platform stabilizing gyroscope under test. The same procedure is used on the remaining stabilizing gyroscope.

In practice, it is also possible to locate two additional gyroscopes on the platforms, such that all stabilizing gyroscopes have their respective drift rates determined and corrected.

Although the invention has been described and illustrated in detail, it is to be understood that the same is by way of illustration and example only and is not to be taken by way of limitation, the spirit and scope of this invention being limited only by the terms of the appended claims.

We claim:
1. In combination:
   a stabilized platform having at least one-degree-of-angular freedom;
   at least one single-degree-of-freedom gyroscope, equal in number to said degrees-of-angular freedom, supported by said platform with their sensing axes, respectively positioned to sense angular displacement of said platform about axes corresponding to said degrees-of-angular-freedom;
   servo means, connected between said gyroscopes and said platform, to stabilize said platform;
   an additional single-degree-of-freedom gyroscope, its case mounted for at least 180° angular displacement, relative to said platform, about an axis of rotation perpendicular to the sensing axis of at least one of said first named gyroscopes, the sensing axis of said additional gyroscope having a direction component parallel to said axis of rotation;
   means for angularly positioning said additional gyroscope about said axis of rotation;
   means for connecting signals from said additional gyroscope to said means for angularly positioning, to limit the angular drive rate of said additional gyroscope about said axis of rotation.

2. The combination as claimed in claim 1 wherein said motive means comprises:
   a torquer motor for applying torques to said additional gyroscope about said axis of rotation;
   an angle of detector for detecting the angular displacement of said additional gyroscope's sensing axis and the sensing axis of one of said first named gyroscopes;
   servo means connected between said torquer motor and said angle detector for nulling to zero said angular displacement;
   a first named gyroscope sensing axis selector connected to said angle detector for selecting the sensing axis and polarity of alignment of said additional gyroscope's sensing axis.

3. The combination as claimed in claim 1 and further comprising a computer means connected to each of the named gyroscopes for detecting the angular displacement of said gyroscopes and supplying an output signal proportional to the difference between the angular displacement of said first named gyroscopes and said additional gyroscope.

4. Apparatus for limiting the rate of rotation of a gyro case comprising in combination:
   a single-degree-of-freedom gyroscope having a rotor adapted to be rotated about an axis defining the gyro spin axis;
   a first means mounting said rotor and rotatably supported by bearings which define the gyro output axis;
   a gyro case supporting the bearings in which said first means is mounted, said gyroscope having an input axis defined as being orthogonal to both said spin axis and said output axis;
   a second mounting means for rotatably mounting said gyro case about a rotational axis at a predetermined angle with respect to said output axis such that said input axis senses a component of the torque applied about said rotational axis;

detecting means for detecting the precession of said first means with respect to said case;

a first servo means connected to said detecting means and said first means for measuring and applying correcting torques to said first means about said output axis to null to zero said precession;

rotating means for rotating said gyro case about said rotational axis;

a second servo means responsive to said correcting torques and connected to said rotating means so as to limit the rate of rotation of said gyro case.

5. Apparatus for controlling the rate of rotation of a gyroscope case comprising in combination:
- a single-degree-of-freedom gyroscope having an input, output, and rotor spin axis;
- mounting means for rotatably mounting said gyroscope such that said output axis is fixed a predetermined angle from the axes of rotation of said mounting means;
- a first servo means, having an input connected to sense the precession of said gyroscope about its output axis and having an output connected to reduce said precession to zero;
- a second servo means having an output adapted to rotating said mounting means about its axis of rotation;
- limiting means connected between the output of said first servo means and the input of said second servo means, said limiting means being adapted to sense the output of said first servo means and to limit the output of said second servo means, when the output of said first servo means reaches a predetermined level.

6. Apparatus for controlling the acceleration and rate of rotation of a gyroscope case comprising:
- a gyroscope, sensitive to torques about an input axis perpendicular to its spin axis;
- a first means mounting said gyroscope with a single-degree-of-freedom about an output axis perpendicular to both said spin axis and said input axis;
- a gyroscope case, rotatably supporting said first means;
- a reference element;
- a second means rotatably mounting the gyroscope case to said reference element, such that said gyroscope's output axis is displaced a predetermined angle from the axis of rotation of said second means;
- means for detecting the rotational displacement of said first means with respect to said gyroscope case;
- a first servo means connected to said detecting means and said first means for nulling to zero said rotational displacement;
- a second servo means for measuring and applying torques to said second means so as to aline said input axis to a preselected cardinal heading;
- a cardinal heading selector connected to said second servo means for supplying a torque corresponding to a selected heading;
- summing means for subtracting the output of said first servo from the measured torque applied to said second means, whereby the torque applied to said second means is limited within a predetermined magnitude.

7. Apparatus for limiting the rate of rotation of a gyro case comprising, in combination:
- a single-degree-of-freedom gyroscope having a rotor adapted to be rotated about an axis defining the gyro spin axis, said rotor having an angular momentum H;
- a first means mounting said rotor and rotatably supported by bearings which define the gyro output axis;
- a gyro case supporting the bearings in which said first means is mounted;
- said gyroscope having an input axis defined as being orthogonal to both said spin axis and said output axis;
- a second means for rotatably mounting said gyro case about a rotational axis displaced an angle $\alpha$ from said output axis;
- motive means for applying a rate $\dot{\psi}$ to said gyro case about said rotational axis such that said input axis senses a component of the rate $\dot{\psi}$ according to the formula:

$$\dot{\psi} \sin \alpha$$

said sensed component appearing at the output of said gyroscope as a torque T which is defined by the formula:

$$T = H\dot{\psi} \sin \alpha$$

- a first servo means connected between said gyro and said motive means for detecting said torque T and limiting said motive means such that said rate $\dot{\psi}$ does not exceed a predetermined maximum value.

8. The apparatus described in claim 7 wherein said first means is a fluid tight container having a first diameter and said gyro case is a fluid tight container having a second diameter which is slightly larger than said first diameter, a fluid having a viscosity coefficient $\beta$ located between said first means and said gyro case;

the angle $\alpha$ being chosen to satisfy the following formula:

$$a = \beta/H$$

References Cited by the Examiner

UNITED STATES PATENTS

| | | | |
|---|---|---|---|
| 1,930,082 | 10/1933 | Boykow | 74—5.34 |
| 2,630,017 | 3/1953 | Slater | 74—5.34 X |
| 2,771,779 | 11/1956 | Schaffer et al. | 74—5.34 |

FRED C. MATTERN, JR., *Primary Examiner.*

BROUGHTON G. DURHAM, MILTON KAUFMAN, *Examiners.*

T. W. SHEAR, P. W. SULLIVAN, *Assistant Examiners.*